United States Patent
Haze

(10) Patent No.: US 9,829,209 B2
(45) Date of Patent: Nov. 28, 2017

(54) INTEGRATED DEMAND CONTROL METHOD AND INTEGRATED DEMAND CONTROL DEVICE

(71) Applicant: Panasonic Intellectual Property Management Co., Ltd., Osaka (JP)

(72) Inventor: Kohei Haze, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 434 days.

(21) Appl. No.: 14/681,131

(22) Filed: Apr. 8, 2015

(65) Prior Publication Data
US 2015/0308703 A1 Oct. 29, 2015

(30) Foreign Application Priority Data
Apr. 24, 2014 (JP) .................. 2014-090641

(51) Int. Cl.
*F24F 11/00* (2006.01)
*G05D 23/19* (2006.01)

(52) U.S. Cl.
CPC ........ F24F 11/006 (2013.01); G05D 23/1923 (2013.01); G05D 23/1934 (2013.01)

(58) Field of Classification Search
CPC .......................... F24F 11/006; G05D 23/1923; G05D 23/1934
USPC ........................................ 700/277
See application file for complete search history.

(56) References Cited

U.S. PATENT DOCUMENTS

| 2007/0082311 | A1* | 4/2007 | Yamaguchi | F26B 21/10 432/1 |
| 2009/0030555 | A1* | 1/2009 | Gray | F24F 11/006 700/277 |
| 2011/0056673 | A1* | 3/2011 | Jang | F24F 11/0012 165/201 |
| 2012/0083927 | A1* | 4/2012 | Nakamura | G05B 13/026 700/278 |
| 2012/0296480 | A1* | 11/2012 | Raman | G05B 13/026 700/277 |
| 2012/0323393 | A1* | 12/2012 | Imhof | G05B 15/02 700/297 |

(Continued)

FOREIGN PATENT DOCUMENTS

JP 2009222260 A * 10/2009
JP 2013-064542 4/2013

Primary Examiner — Kenneth M Lo
Assistant Examiner — Michael J Huntley
(74) Attorney, Agent, or Firm — Greenblum & Bernstein, P.L.C.

(57) ABSTRACT

An integrated demand control method for air conditioners disposed in areas includes receiving temperature of each of the areas, receiving control cancellation signal of each of the areas, storing, as cancellation temperature, the received temperature of each of the areas each time when the demand control cancellation signal is received, determining reference cancellation temperature of each of the areas according to distribution of the stored cancellation temperatures of each of the areas, setting higher demand control priority to each of the areas having smaller demand control allowable index, the demand control allowable index being difference between the temperature of each of the areas at a predetermined time point and the reference cancellation temperature of each of the areas.

9 Claims, 9 Drawing Sheets

(56) References Cited

U.S. PATENT DOCUMENTS

2013/0187462 A1* 7/2013 Lim ................... H02J 9/066
  307/39
2015/0277465 A1* 10/2015 Deligiannis ............... G05F 1/66
  700/295

* cited by examiner

FIG. 3

| POWER CONSUMER | DEMAND CANCELLATION TEMPERATURE (°C) | CANCELLATION FREQUENCY |
|---|---|---|
| 130a | 26 | 1 |
| | 27 | 3 |
| | ... | ... |
| | 30 | 4 |
| | ... | ... |
| 130b | 26 | 2 |
| | ... | ... |
| ... | ... | ... |
| 130l | 26 | 3 |
| | ... | ... |

FIG. 4

| POWER CONSUMER | | (a) TEMPERATURE (°C) | (b) REFERENCE CANCELLATION TEMPERATURE | (c) DEMAND CONTROL ALLOWABLE INDEX (b-a) |
|---|---|---|---|---|
| GROUP A | 130a | 25 | 26 | 1 |
| | 130b | 29 | 30 | 1 |
| GROUP B | 130c | 24 | 26 | 2 |
| | 130d | 25 | 27 | 2 |
| GROUP C | 130e | 25 | 29 | 4 |
| | 130f | 25 | 30 | 5 |
| GROUP D | 130g | 29 | 35 | 6 |
| | 130h | 24 | 30 | 6 |
| GROUP E | 130i | 28 | 35 | 7 |
| | 130j | 26 | 33 | 7 |
| GROUP F | 130k | 22 | 32 | 10 |
| | 130l | 21 | 32 | 11 |

FIG. 7

|  | POWER CONSUMER | (a) TEMPERATURE (°C) | (b) REFERENCE CANCELLATION TEMPERATURE | (c) DEMAND CONTROL ALLOWABLE INDEX (b-a) |
|---|---|---|---|---|
| GROUP A | 130l | 21 | 32 | 11 |
| | 130k | 22 | 32 | 10 |
| GROUP B | 130j | 26 | 33 | 7 |
| | 130i | 28 | 35 | 7 |
| GROUP C | 130h | 24 | 30 | 6 |
| | 130g | 29 | 35 | 6 |
| GROUP D | 130f | 25 | 30 | 5 |
| | 130e | 25 | 29 | 4 |
| GROUP E | 130d | 25 | 27 | 2 |
| | 130c | 24 | 26 | 2 |
| GROUP F | 130b | 29 | 30 | 1 |
| | 130a | 25 | 26 | 1 |

INTEGRATED DEMAND CONTROL METHOD AND INTEGRATED DEMAND CONTROL DEVICE

BACKGROUND

1. Technical Field

The present disclosure relates to an integrated demand control method and device.

2. Description of the Related Art

Attention has been paid to utilization of distributed power sources such as photovoltaic and wind power plants in recent years. If such distributed power sources are combines with traditional power sources used by power companies, it is necessary to adjust the demand-supply balance of power. This requires construction of a power system for realizing high-efficiency power transmission and distribution, such as a smart grid.

The functions of a smart grid include a function of, when the power supply from power suppliers becomes unstable or insufficient, urging power consumers to reduce power consumption, that is, the demand-response function.

Attention also has been paid in recent years to aggregator services which make contracts with multiple power consumers, adjust the power demand/supply of power companies, the surplus power trading market, or the like in place of the power consumers, and demand-control the devices of the power consumers in accordance with the adjusted amounts (e.g., Japanese Unexamined Patent Application Publication No. 2013-64542).

SUMMARY

However, the technology disclosed in Japanese Unexamined Patent Application Publication No. 2013-64542 cannot provide sufficient comfort or convenience for the power consumers.

One non-limiting and exemplary embodiment provides an integrated demand control device which controls devices disposed in multiple areas without impairing the comfort or convenience of the residents in the areas.

In one general aspect, the techniques disclosed here feature an integrated demand control method for air conditioners disposed in areas. The integrated demand control method for air conditioners disposed in areas includes receiving temperature of each of the areas, receiving control cancellation signal of each of the areas, storing, as cancellation temperature, the received temperature of each of the areas each time when the demand control cancellation signal is received, determining reference cancellation temperature of each of the areas according to distribution of the stored cancellation temperatures of each of the areas, setting higher demand control priority to each of the areas having smaller demand control allowable index, the demand control allowable index being difference between the temperature of each of the areas at a predetermined time point and the reference cancellation temperature of each of the areas.

It should be noted that general or specific embodiments may be implemented as a system, a method, an integrated circuit, a computer program, a storage medium such as a computer-readable CD-ROM, or any selective combination thereof.

According to the integrated demand control method of the present disclosure, the devices disposed in the areas can be demand-controlled without impairing the comfort or convenience of the residents in the areas.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram showing an example of a cancellation temperature table according to the first embodiment;

FIG. 4 is a diagram showing demand-controlled groups determined according to the first embodiment;

FIG. 7 is a diagram showing demand-controlled groups determined according to a second embodiment;

DETAILED DESCRIPTION

Figure 1:
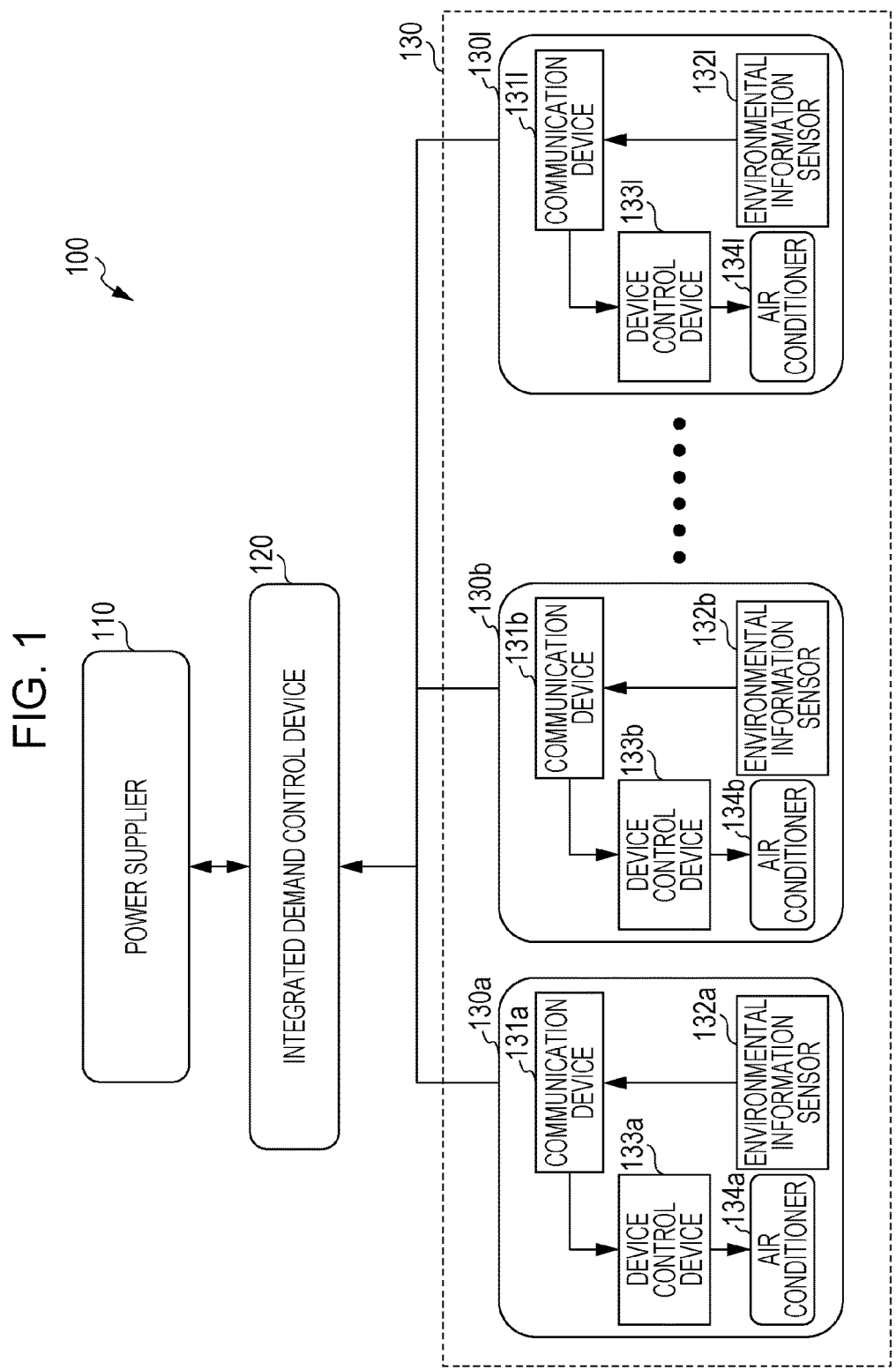
FIG. 1 is diagram showing an example configuration of an integrated demand control system according to a first embodiment.

An integrated demand control method for air conditioners disposed in areas. The integrated demand control method for air conditioners disposed in areas includes receiving temperature of each of the areas, receiving control cancellation signal of each of the areas, storing, as cancellation temperature, the received temperature of each of the areas each time when the demand control cancellation signal is received, determining reference cancellation temperature of each of the areas according to distribution of the stored cancellation temperatures of each of the areas, setting higher demand control priority to each of the areas having smaller demand control allowable index, the demand control allowable index being difference between the temperature of each of the areas at a predetermined time point and the reference cancellation temperature of each of the areas.

For example, the integrated demand control including demand-controlling the air conditioners of the areas in the descending order of the demand control priorities.

For example, the integrated demand control including assigning longer demand control time periods to the air conditioners of the areas having the higher demand control priorities.

For example, the integrated demand control including sending stop commands to the air conditioners of each of the areas in the ascending order of the demand control priorities.

For example, the reference cancellation temperatures of each of the areas are expected values of the stored cancellation temperatures of each of the areas.

For example, the reference cancellation temperatures of each of the areas are the cancellation temperature at which cancellation of demand control has occurred most frequently.

For example, display devices for displaying information indicating demand control are disposed in the regions.

An integrated demand control method for showcases equipped with refrigeration facilities disposed in areas, the method includes receiving temperature of each of the showcases, receiving control cancellation signal of each of the areas, storing, as cancellation temperature, the received temperature of each of the showcases each time when the demand control cancellation signal is received, determining reference cancellation temperature of each of the showcases according to distribution of the stored cancellation temperatures of each of the showcases, setting higher demand control priority to each of the areas having smaller demand control allowable index, the demand control allowable index being difference between the temperature of each of the showcases at a predetermined time point and the reference cancellation temperature of each of the showcases.

An integrated demand control method for illumination facilities disposed in areas, the method includes receiving illuminance of each of the illumination facilities, receiving control cancellation signal of each of the areas, storing, as cancellation illuminance, the received illuminance of each of the illumination facilities each time when the demand control cancellation signal is received, determining reference cancellation illuminance of each of the illumination facilities according to distribution of the stored cancellation illuminances of each of the illumination facilities, setting higher demand control priority to each of the areas having smaller demand control allowable index, the demand control allowable index being difference between the illuminance of each of the illumination facilities at a predetermined time point and the reference cancellation illuminance of each of the illumination facilities.

An integrated demand control device for air conditioners disposed in areas includes one or more memories; and circuitry operative to: receive temperature of each of the areas; receive control cancellation signal of each of the areas; store as cancellation temperature, the received temperature of each of the areas each time when the demand control cancellation signal is received; determine reference cancellation temperature of each of the areas according to distribution of the stored cancellation temperatures of each of the areas; set higher demand control priority to each of the areas having smaller demand control allowable index, the demand control allowable index being difference between the temperature of each of the areas at a predetermined time point and the reference cancellation temperature of each of the areas.

An integrated demand control method according to one aspect of the present disclosure is an integrated demand control method performed by an integrated demand control device for demand-controlling devices disposed in multiple areas. The integrated demand control method includes: receiving state indexes indicating states of the areas acquired by sensors; when the device of one area receives a demand control cancellation signal, receiving a cancellation state index of the area; storing the received cancellation state indexes of the areas; determining reference cancellation state indexes of the areas on the basis of the stored cancellation state indexes; determining a demand control condition of the areas on the basis of the determined reference cancellation state indexes; and sending demand control signals to control devices disposed in the areas on the basis of the determined demand control condition.

For example, the demand control condition of the respective areas may be determined based on the demand control allowable indexes, which are the differences between the state indexes of the areas at a predetermined time point and the corresponding reference cancellation state indexes.

Thus, the demand control can be performed considering the probability that the demand control may be cancelled.

For example, the demand control condition may be the order in which the areas are demand-controlled.

For example, the demand control may be control for reducing the power consumption of the devices during the demand control, and the order may be determined in such a manner that the devices of the areas having larger demand control allowable indexes are demand-controlled earlier.

Thus, the power consumption of the devices of areas having lower cancellation probabilities can be preferentially reduced earlier.

For example, the order may be determined in such a manner that the device of the area having the largest demand control allowable index is demand-controlled first.

For example, the demand control may be control for operating the devices during the demand control, and the order may be determined in such a manner that the devices of the areas having smaller demand control allowable indexes are demand-controlled earlier.

Thus, the devices of the areas having higher cancellation probabilities can be preferentially operated earlier.

For example, the order may be determined in such a manner that the device of the area having the smallest demand control allowable index is demand-controlled first.

For example, the demand control condition may be the time periods over which the areas are demand-controlled.

For example, the demand control may be control for reducing the power consumption of the devices during the demand control, and the time periods may be determined in such a manner that the devices of the areas having larger demand control allowable indexed are demand-controlled longer.

Thus, the power consumption of the devices of areas having lower cancellation probabilities can be preferentially reduced longer.

For example, the time periods may be determined in such a manner that the device of the area having the largest demand control allowable index is demand-controlled longest.

For example, the demand control may be control for operating the devices during the demand control, and the time periods may be determined in such a manner that the devices of the areas having smaller demand control allowable indexes are demand-controlled shorter.

Thus, the power consumption of the devices of areas having higher cancellation probabilities can be preferentially reduced shorter.

For example, the time periods may be determined in such a manner that the device of the area having the smallest demand control allowable index is demand-controlled longest.

For example, the demand control condition may be the demand control set values of the devices of the areas.

For example, the reference cancellation state indexes are determined from the probability distribution of the stored cancellation state indexes.

Thus, the cancellation probabilities of the areas can be estimated.

For example, the demand control condition is determined from the areas whose devices are operating prior to the demand control time periods.

For example, the devices may be air conditioners, the state indexes may be temperatures of the areas, the cancellation state index may be a cancellation temperature of an area when the device of the area receives a demand control cancellation signal, and the reference cancellation state indexes may be reference cancellation temperatures determined based on the stored cancellation temperatures.

Thus, integrated demand control can be performed on the devices of the multiple areas without impairing the comfort or convenience of the residents in the areas.

For example, the devices may be showcases equipped with refrigeration facilities, the state indexes may be temperatures in the showcases, the cancellation state index may be a cancellation temperature in a showcase when the showcase receives a demand control cancellation signal, and the reference cancellation state indexes may be reference cancellation temperatures determined based on the stored cancellation temperatures.

Thus, integrated demand control can be performed on the showcases of the multiple areas without impairing the comfort or convenience of the residents in the areas.

For example, the devices may be illumination facilities, the state indexes may be illuminances of the areas, the cancellation state index may be a cancellation illuminance of one area when the illumination facility disposed in the area receives a demand control cancellation signal, and the reference cancellation state indexes may be reference cancellation illuminances determined based on the stored cancellation illuminances.

Thus, integrated demand control can be performed on the illumination facilities of the multiple areas without impairing the comfort or convenience of the residents in the areas.

For example, display devices may be further disposed in the areas, information indicating the demand control condition may be sent to the control devices, and the control devices may display information indicating the demand control condition on the display devices.

Thus, the users in the areas can know the demand control schedule, the grouping of the power consumers, and the ground for determining the order in which the power consumers are demand-controlled.

An integrated demand control device according to one aspect of the present disclosure is an integrated demand control device for demand-controlling devices disposed in multiple areas. The integrated demand control device includes: a first receiving unit that receives state indexes indicating states of the areas acquired by sensors; a second receiving unit that when the device of one area receives a demand control cancellation signal, receives a cancellation state index of the area; a storage unit that stores the received cancellation state indexes of the areas; a reference determination unit that determines reference cancellation state indexes of the areas on the basis of the stored cancellation state indexes; a demand control condition determination unit that determines a demand control condition of the areas on the basis of the determined reference cancellation state indexes; and a sending unit that sends demand control signals to control devices disposed in the areas on the basis of the determined demand control condition.

Thus, effects similar to those of the integrated demand control methods are produced.

Now, embodiments of the present disclosure will be described with reference to the drawings.

Any of the embodiments below represents a comprehensive or specific example. Values, shapes, elements, the positions and connection forms of the elements, the steps of a process, the order of the steps, and the like described in the embodiments are only illustrative. Accordingly, the present disclosure is not limited to the embodiments. Of the elements of the embodiments, elements which are not described in the independent claims representing the highest concept of the present disclosure are described as optional elements.

<Knowledge Acquired by Inventors>

The technology disclosed in Japanese Unexamined Patent Application Publication No. 2013-64542 sets the control time of each area on the basis of the temperature of the area without considering the preferences of the residents in the area and therefore may impair the comfort of the residents in the area. Residents which have lost the comfort due to the demand control may cancel the demand control. This prevents the aggregator from stably providing demand response services. In performing demand-response control, it is necessary not to impair the comfort of the power consumers or the quality of articles as much as possible. This is because when the demand control impairs the comfort of the residents or the quality of articles, the residents may refuse or cancel the demand control. If power consumers who have made contracts on demand control with power suppliers refuse or cancel the demand control, the aggregator cannot fulfill the contracts, failing to earn a sufficient profit.

For this reason, in order to allow the aggregator to stably provide demand response services, the inventors of the present disclosure have conceived of learning or estimating the preferences on the comfort of the power consumers or the quality of articles by noting a demand control cancellation action taken by the power consumers and referring to a state variable of the environment when the cancellation has been made. According to the present disclosure, by performing demand control on the basis of the learned or estimated preferences on the comfort of the power consumers or the quality of articles, it is possible to make the demand control less likely to be refused or cancelled. As a result, the aggregator can stably provide demand response services without impairing the comfort of the residents or the quality of articles in each area.

First Embodiment

An integrated demand control system according to the present embodiment demand-controls air conditioners disposed in respective areas in an integrated manner.

FIG. 1 shows an example configuration of an integrated demand control system 100 according to the present embodiment. The integrated demand control system 100 includes a power supplier 110, an integrated demand control device 120, and power consumers 130 which are incorporated in a smart grid environment.

The power supplier 110 makes a contract with an aggregator equipped with the integrated demand control device 120 and requests the aggregator to perform demand control. The power supplier 110 is a power plant such as a thermal power plant, hydro power plant, wind power plant, nuclear power plant, or photovoltaic power plant. Examples of the power supplier 110 are not limited to these types of power plants and include power suppliers which make contracts with one or more of these power plants and sell power.

Under contract with the power supplier 110 to perform demand control, the integrated demand control device 120 sends demand control commands to the power consumers 130 who are under contract with the aggregator. When the demand control is successful, the aggregator receives an incentive from the power supplier 110. The aggregator gives part of the incentive received from the power supplier 110 to the power consumers 130.

In the present embodiment, a demand control command is a command for operating the air conditioner 134 of a power consumer 130 during demand control.

The power consumers 130 demand-control the air conditioners 134 thereof on the basis of the demand control commands received from the integrated demand control device 120. The power consumers 130a to 130l may be physically partitioned individual rooms or the spatial areas of a building, or may be combinations thereof. While there are 12 power consumers in the present embodiment, the number of power consumers may be any number as long as it is two or more.

Each power consumer 130 includes a communication device 131, an environmental information sensor 132, a device control device 133, and an air conditioner 134.

The communication device 131 receives a demand control command from the integrated demand control device 120 and sends it to the device control device 133. The communication device 131 also receives an environmental state index (may be simply referred to as a state index) from the environmental information sensor 132 and sends it to the integrated demand control device 120.

The environmental information sensor 132 detects a predetermined type of environmental information (state index) representing the environment (state) of the power consumer 130 and sends the predetermined type of environmental information to the communication device 131. In the present embodiment, the predetermined type of environmental information refers to room temperature, humidity, outdoor temperature, the amount of solar radiation, or the like but not limited thereto. It only has to be an index related to cancellation of the demand control on the air conditioner 134 by the power consumer. In the present embodiment, it is assumed that the environmental information sensor 132 is a temperature sensor.

The device control device 133 receives the demand control command from the communication device 131 and demand-controls the air conditioner 134 on the basis of the received demand control command.

While the devices to be demand-controlled are the air conditioners 134 in the present embodiment, they are not limited to the air conditioners 134. The devices to be demand-controlled may be any type of devices as long as they are devices related to cancellation by a power consumer of demand control based on room temperature, humidity, or the like.

The resident cancels the demand control on the air conditioner 134 by directly operating the device control device 133 or air conditioner 134 or operating it using a remote control to input a cancellation signal to it. Upon receipt of the cancellation signal, the device control device 133 or air conditioner 134, sends a notification to that effect to the communication device 131, which in turn sends a notification indicating that the demand control of the air conditioner 134 has been cancelled, to the integrated demand control device 120. The communication device 131 may send the cancellation signal, as well as a state index received from the environmental information sensor 132 to the integrated demand control device 120.

While the communication device 131, environmental information sensor 132, device control device 133, and air conditioner 134 are separate elements in the present embodiment, the device control device 133, for example, may be integral with the communication device 131 or environmental information sensor 132. The device control device 133 may also be integral with the air conditioner 134. In this case, the air conditioner 134 demand-controls itself (e.g., changes the operation mode) on the basis of a demand control command from the communication device 131. As seen above, the elements of the power consumer 130 may be separate elements, or some or all thereof may form a single element.

Figure 2:
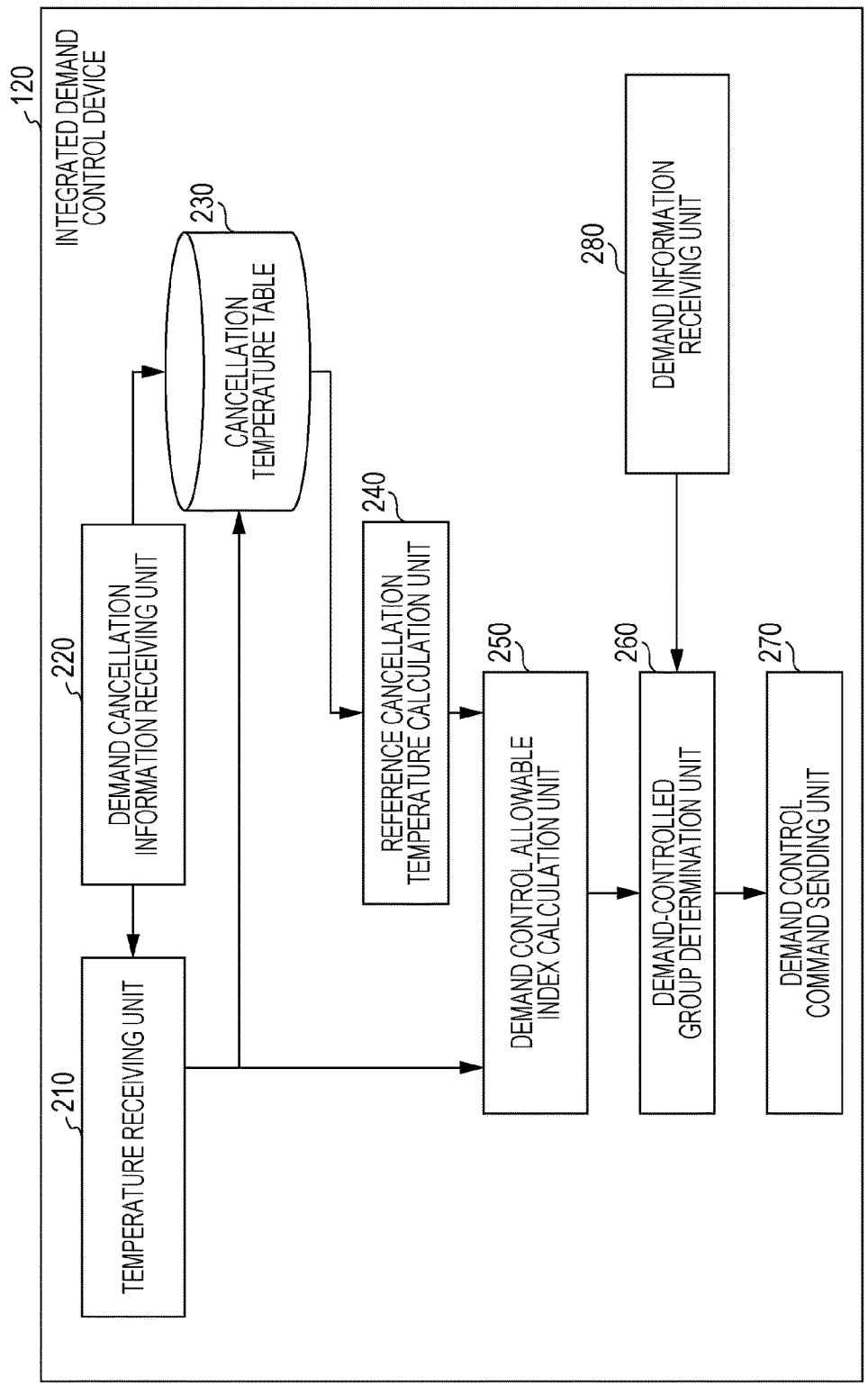
FIG. 2 is a block diagram of the integrated demand control device according to the first embodiment.

FIG. 2 is a block diagram of the integrated demand control device according to the present embodiment.

The integrated demand control device 120 includes a temperature receiving unit 210, a demand cancellation information receiving unit 220, a cancellation temperature table 230, a reference cancellation temperature calculation unit 240, a demand control allowable index calculation unit 250, a demand-controlled group determination unit 260, a demand control command sending unit 270, and a demand information receiving unit 280.

The temperature receiving unit 210 receives temperature information of each power consumer 130 from the environmental information sensor 132 thereof and sends it to the cancellation temperature table 230 or demand control allowable index calculation unit 250.

The demand cancellation information receiving unit 220 receives information indicating that the demand control being performed on the air conditioner 134 of a power consumer 130 has been cancelled by the resident (hereafter referred to as the "demand cancellation information"). The demand cancellation information receiving unit 220 then sends the demand cancellation information to the temperature receiving unit 210 and cancellation temperature table 230. The temperature receiving unit 210 receives the demand cancellation information, receives the temperature of the power consumer 130 at the point in time when the demand control has been cancelled (hereafter referred to as the "demand cancellation temperature"), and sends the demand cancellation temperature to the cancellation temperature table 230.

The cancellation temperature table 230 is, for example, a table as shown in FIG. 3 and stores, as histories, the demand cancellation temperature of each power consumer 130 and the frequency with which the demand control has been cancelled at the demand cancellation temperature (hereafter referred to as the "cancellation frequency"). As an example, FIG. 3 shows that the demand control has been cancelled once at 26° C., three times at 27° C., and four times at 30° C. in the power consumer 130a. The cancellation temperature table 230 is updated each time it receives demand cancellation information from the demand cancellation information receiving unit 220 and temperature receiving unit 210.

The reference cancellation temperature calculation unit 240 receives the demand cancellation temperature histories of each power consumer 130 from the cancellation temperature table 230 and calculates the temperature at which cancellation of the demand control is most likely to occur in the power consumer 130 (hereafter referred to as the "reference cancellation temperature"). Specifically, the reference cancellation temperature may be the expected value of the temperatures at which cancellation of the demand control occurs in each power consumer 130 or may be the temperature at which cancellation of the demand control has occurred most frequently in each power consumer 130. The reference cancellation temperature may also be calculated by previously storing also temperatures of power consumers 130 which have yet to be demand-controlled and making Bayesian inference from the stored temperatures.

The demand control allowable index calculation unit 250 receives the temperatures of the respective power consumers 130 at a predetermined time point from the temperature receiving unit 210 and receives the calculated reference cancellation temperatures of the respective power consumers 130 from the reference cancellation temperature calculation unit 240. The demand control allowable index calculation unit 250 then calculates the differences between the reference cancellation temperatures and temperatures at the predetermined time point of the power consumers 130 and determines these differences as the demand control allowable indexes of the respective power consumers 130. The demand control allowable index calculation unit 250 calculates the demand control allowable indexes prior to starting the demand control. By making this calculation at a time point closer to the time point when the demand control is started, it can more accurately group the power consumers 130 for demand control.

Alternatively, the demand control allowable index calculation unit 250 may calculate the demand control allowable indexes during the demand control. Further, when demand cancellation information is received from a certain power consumer 130 during the demand control, the demand control allowable index calculation unit 250 may recalculate a demand control allowable index.

The demand information receiving unit 280 receives demand control information including the demand control time from the power supplier 110 and sends it to the demand-controlled group determination unit 260.

The demand-controlled group determination unit 260 groups the power consumers 130 in the ascending order of demand control allowable indexes on the basis of the determination that power consumers 130 having smaller demand control allowable indexes have higher priorities in performing demand control. Since there are 12 power consumers in the present embodiment, six groups each including two power consumers, A to F, may be made. However, the number of groups may be numbers other than six. The grouping will be described in detail using a specific example shown in FIG. 4.

The priorities determined by the demand-controlled group determination unit 260 may be the order in which the groups are demand-controlled or may be the time widths with which the groups are demand-controlled. If the priorities are the order in which the groups are demand-controlled, groups having higher priorities are demand-controlled earlier. If the priorities are the time widths with which the groups are demand-controlled, groups having higher priorities are demand-controlled longer. The demand-controlled group determination unit 260 may also preferentially group power consumers 130 whose air conditioners 134 are operating before the demand control time.

The demand-controlled group determination unit 260 also determines details of the control on each group on the basis of the demand control information received from the demand information receiving unit 280 and generates demand control commands to be sent to all the power consumers 130 to perform the demand control. The details of the control on each group include, for example, the set temperature of the air conditioner 134 of each power consumer 130. The demand-controlled group determination unit 260 also generates demand control removal commands for removing the demand control.

The demand control command sending unit 270 sends the demand control commands to the communication devices 131 of the respective power consumers 130 on the basis of the groups, the details of the control, and the priorities determined by the demand-controlled group determination unit 260.

FIG. 4 is a diagram showing the demand-controlled groups determined according to the present embodiment. In the present embodiment, a demand control allowable index is calculated as a value obtained by subtracting a temperature prior to starting the demand control from the corresponding reference cancellation temperature. As shown in FIG. 4, with respect to the power consumer 130a, for example, the temperature prior to starting the demand control is 25° C.; the reference cancellation temperature is 26° C.; and the demand control allowable index is 1. Also with respect to the power consumers 130b to 130l, the demand control allowable indexes are calculated as well. As a result, the power consumers 130a and 130b, which have the smallest demand control allowable indexes, are grouped into a group A having the highest priority. Similarly, the other power consumers 130 are grouped into groups B to F in the ascending order of demand control allowable indexes.

Figure 5:
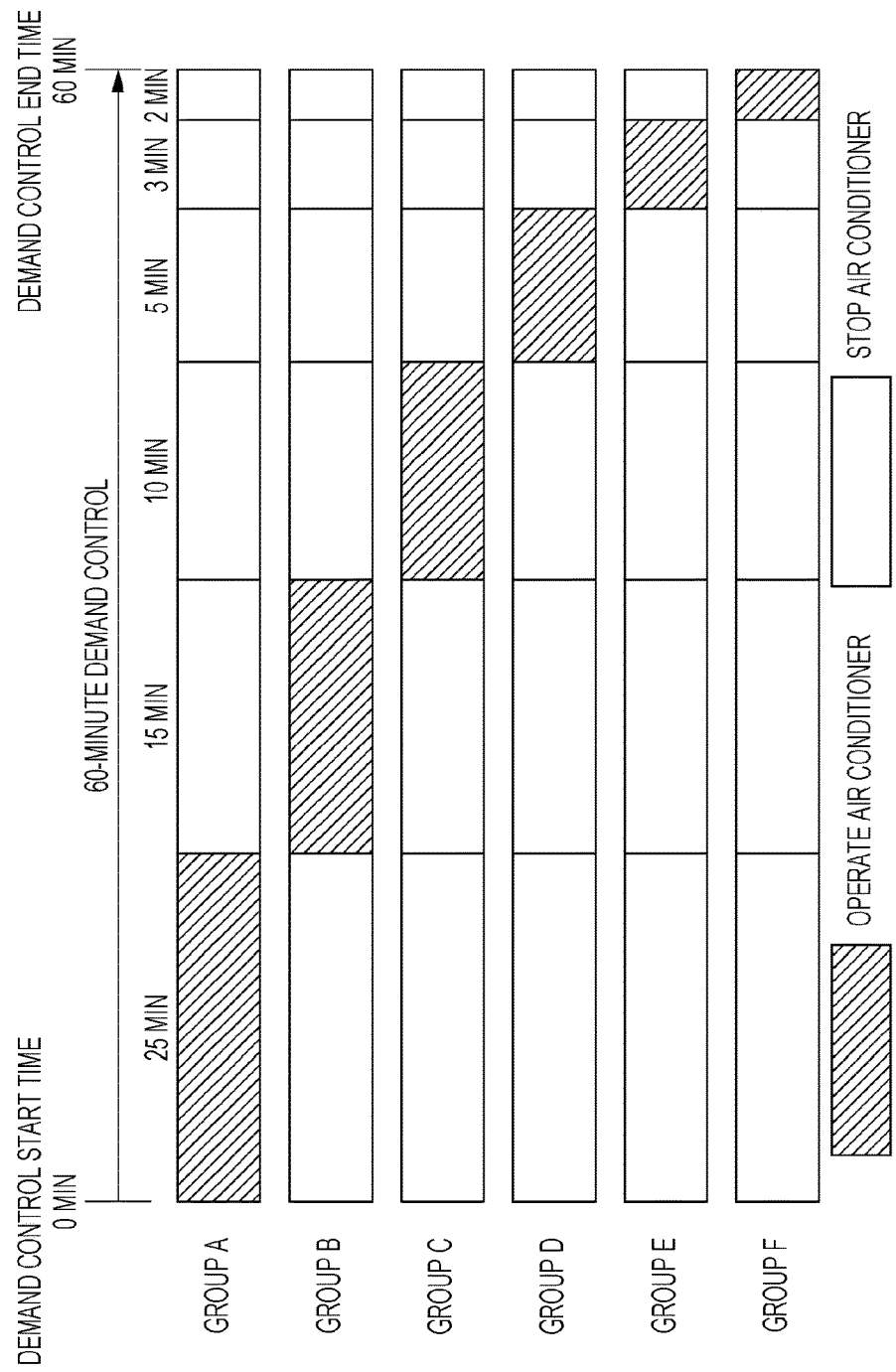
FIG. 5 is a diagram showing an example of drive control on air conditioners disposed in respective areas according to the first embodiment.

FIG. 5 is a diagram showing an example of the drive control on the air conditioners disposed in the respective areas according to the present embodiment.

FIG. 5 shows the demand control pattern of the air conditioners 134 of the power consumers 130 belonging to the groups A to F when the demand control time is set to 60 minutes. In the present embodiment, the air conditioners 134 are operated in the assigned demand control time periods which are in rotation, and stopped in the other time periods. More specifically, each air conditioner 134 is operated in the demand control time period assigned thereto on the basis of a demand control command signal for operating the air conditioner 134 sent from the demand control command sending unit 270 and stopped in the other time periods on the basis of a demand control command signal for stopping the air conditioner 134 sent therefrom.

Note that the air conditioner 134 need not necessarily be stopped to perform demand control. Instead of stopping the air conditioner 134, the output thereof may be reduced compared to the normal output. More specifically, in the demand control time period, each air conditioner 134 may be operated as usual on the basis of a demand control command signal for operating the air conditioner 134 as usual sent from the demand control command sending unit 270; in the other time periods, the output of each air conditioner 134 may be reduced compared to the usual output on the basis of a demand control command signal for reducing the output of the air conditioner 134 compared to the usual output sent therefrom.

At the demand control start time (0 minute), only the air conditioners 134 of the power consumers, 130a and 130b, belonging to the highest-priority group, A, are operated based on operation commands sent from the demand control command sending unit 270, and the air conditioners 134 of the power consumers, 130c to 130l, belonging to the other groups are stopped based on stop commands sent therefrom.

When 25 minutes pass after the demand control start time, only the air conditioners 134 of the power consumers, 130c and 130d, belonging to the second-highest-priority group, B, are operated based on operation commands sent from the demand control command sending unit 270, and the air conditioners 134 of the power consumers, 130a, 130b, and 130e to 130l, belonging to the other groups are stopped based on stop commands sent therefrom. The air conditioners 134 of the power consumers 130 belonging to the group B, which is lower in priority than the group A, have a shorter operation time width than that of the group A.

Subsequently, until the demand control end time (sixty minutes), the groups C to F are demand-controlled based on the priorities thereof.

When the demand control end time (sixty minutes) comes, the demand control command sending unit 270 sends, to the power consumers 130, commands for restoring the drive mode to that prior to starting the demand control. As seen above, power consumers 130 having higher priorities, that is, power consumers 130 which have smaller differences between the reference cancellation temperatures and the temperatures at the predetermined time point and thus are more likely to cancel the demand control are preferentially demand-controlled.

While FIG. 5 shows an example where the order in which the power consumers are demand-controlled and the time widths with which the power consumers are demand-controlled are determined based on the demand control allowable indexes, both of these need not necessarily be determined. That is, only one of the order and time widths may be determined based on the demand control allowable indexes.

Figure 6:
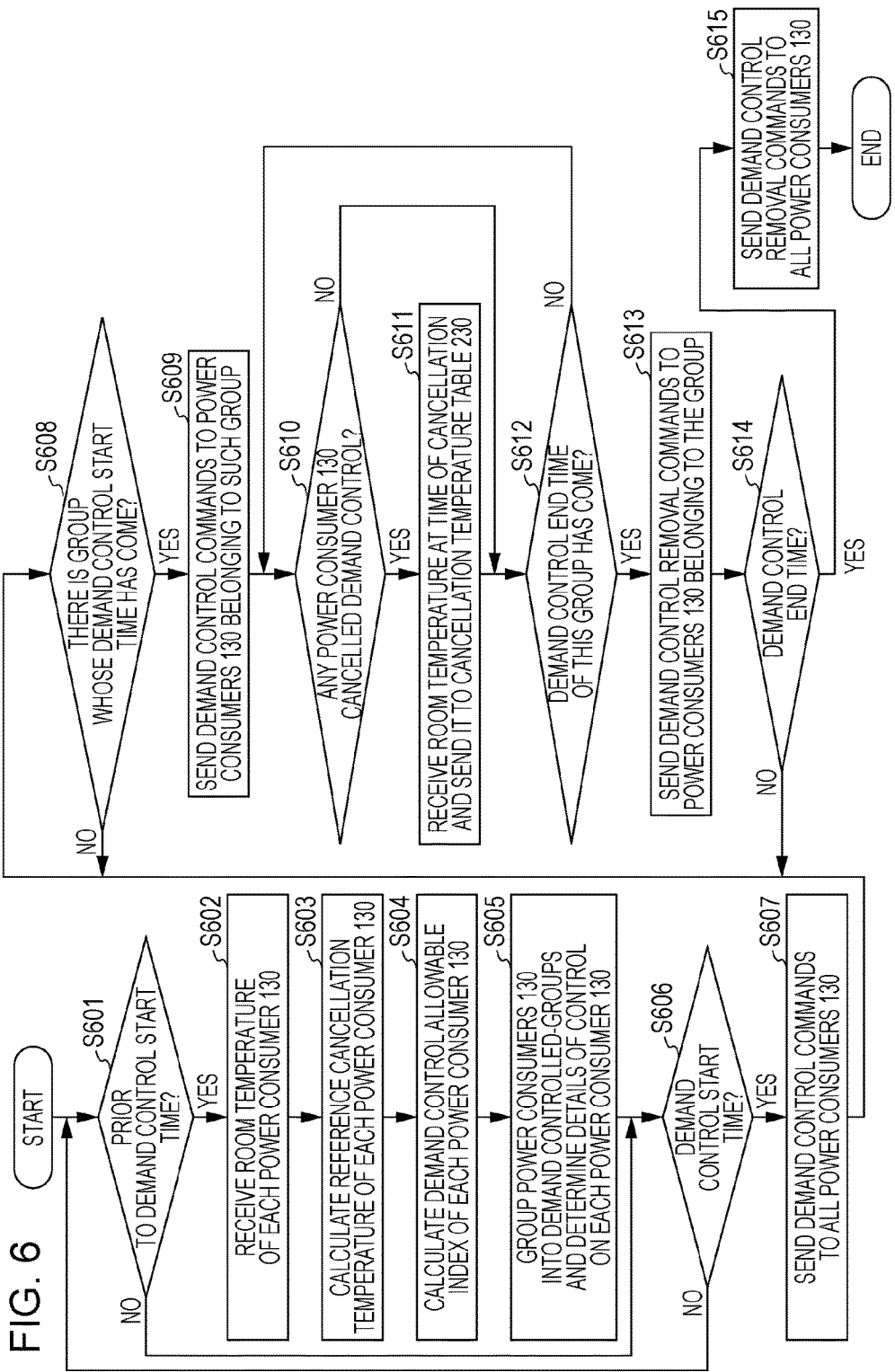
FIG. 6 is a flowchart showing a process performed by an integrated demand control device according to the first embodiment.

FIG. 6 is a flowchart showing a process performed by the integrated demand control device according to the present embodiment.

First, the demand control allowable index calculation unit 250 determines whether the current time is prior to the demand control start time (step S601).

If not so determined (NO in step S601), the process proceeds to step S606.

If so determined (YES in step S601), the temperature receiving unit 210 receives the temperature measured by the environmental information sensor 132 of each power consumer 130 from the communication device 131 thereof (step S602).

The reference cancellation temperature calculation unit 240 then acquires the demand cancellation temperature histories of the respective power consumers 130 from the cancellation temperature table 230 and calculates the reference cancellation temperatures of the power consumers 130 (step S603).

The demand control allowable index calculation unit 250 calculates the demand control allowable indexes of the respective power consumers 130 using the temperatures at the predetermined time point and reference cancellation temperatures received from the reference cancellation temperature calculation unit 240 (step S604).

The demand-controlled group determination unit 260 then groups the power consumers 130 on the basis of the calculated demand control allowable indexes and determines details of the demand control on each group (step S605).

The demand control command sending unit 270 then determines whether the demand control start time has come (step S606).

If not so determined (NO in step S606), the process returns to step S601, and the demand control command sending unit 270 waits for the demand control start time to come.

If so determined (YES in step S606), the demand control command sending unit 270 sends, to all the power consumers 130, demand control commands for stopping the corresponding air conditioners 134 (step S607).

The demand control command sending unit 270 then determines whether there is a group whose demand control start time has come (step S608).

If such a group exists (YES in step S608), the demand control command sending unit 270 sends, to the power consumers 130 belonging to that group, demand control commands including details of the demand control determined by the demand-controlled group determination unit 260 (step S609).

The groups whose demand control start time has not come yet wait for such a time to come (NO in step S608).

If any of the power consumers 130 which are being demand-controlled based on the received demand control commands cancels the demand control (YES in step S610), the temperature receiving unit 210 receives the temperature at the time of the cancellation measured by the environmental information sensor 132 of the power consumer 130 from the communication device 131 thereof and sends the temperature to the cancellation temperature table 230 (step S611).

The demand control command sending unit then 270 determines whether the demand control end time of this group has come (step S612).

If not so determined (NO in step S612), the process returns to step S610, and the demand control command sending unit 270 waits for the demand control end time of the group to come.

If so determined (YES in step S612), the demand control command sending unit 270 sends demand control removal commands for removing the demand control to the power consumers 130 belonging to the group (step S613).

The demand control command sending unit 270 then determines whether the demand control end times of all the groups have come (step S614).

If not so determined (NO in step S614), the process returns to step S608, and the demand control command sending unit 270 waits for the demand control start times of the remaining groups to come.

If so determined (YES in step S614), the demand control command sending unit 270 sends demand control removal commands to all the power consumers 130 (step S615), ending the process.

In this way, the air conditioners 134 of the power consumers 130 belonging to the respective groups are demand-controlled. While FIG. 6 shows an example where the air conditioners 134 of all the power consumers 130 are first stopped and demand control commands are then sent to the respective groups in turn, this example is not limiting. For example, at the demand control start time, the air conditioners 134 of the group to be demand-controlled first may be continuously operated and the air conditioners 134 of the other groups may be stopped. In this case, when the air conditioners 134 of the second group are demand-controlled, signals for stopping the air conditioners 134 of the first group are sent, and signals for operating the air conditioners 134 of the second group are sent. Subsequently, each time the group to be demand-controlled is changed to another, a similar process is performed. That is, it is only necessary to operate or stop the air conditioners 134 of the respective power consumers in such a manner that the power consumers 130 grouped in step S605 are demand-controlled based on the details determined in step S605. Accordingly, the method for sending demand control signals is not limited to that described above.

The integrated demand control method according to the present embodiment has been described with reference to FIGS. 1 to 6. As seen above, in the present embodiment, the order in which the air conditioners 134 of the power consumers 130 are demand-controlled and the time widths with they are demand-controlled are determined considering the comfort of the respective power consumers 130. To the greatest extent possible, the temperatures of power consumers 130 being demand-controlled are prevented from exceeding the corresponding reference cancellation temperatures. Thus, the demand control is performed at a low cancellation rate.

As a result, if certain power consumers 130 are being excessively cooled or if the residents in certain power consumers 130 are extremely sensitive to the cold, it is possible to perform demand control in such a manner that such differences in environment or resident preference among the power consumers 130 are considered. Thus, it is possible to demand-control the devices of the multiple areas without impairing the comfort or convenience of the residents in the areas.

Second Embodiment

The integrated demand control system 100 according to the first embodiment performs demand control as follows: devices having smaller cancellation allowable indexes are preferentially assigned demand control time periods which are in rotation; and all the devices are operated in the assigned demand control time periods and stopped in the other time periods. On the other hand, an integrated demand control system 100 according to the present embodiment performs demand control as follows: devices having larger cancellation allowable indexes are preferentially assigned demand control time periods which are in rotation; and all the devices are stopped in the assigned demand control time periods and operated in the other time periods.

Now, the present embodiment will be described in detail with reference to FIGS. 7 and 8. In the present embodiment, the same elements as those in the first embodiment are given the same reference signs and will not be described.

FIG. 7 is a diagram showing demand-controlled groups determined according to the present embodiment. In the present embodiment, power consumers 130 having larger demand control allowable indexes are grouped into groups having higher priorities. The order of groups A to F is the descending order of priorities.

Figure 8:
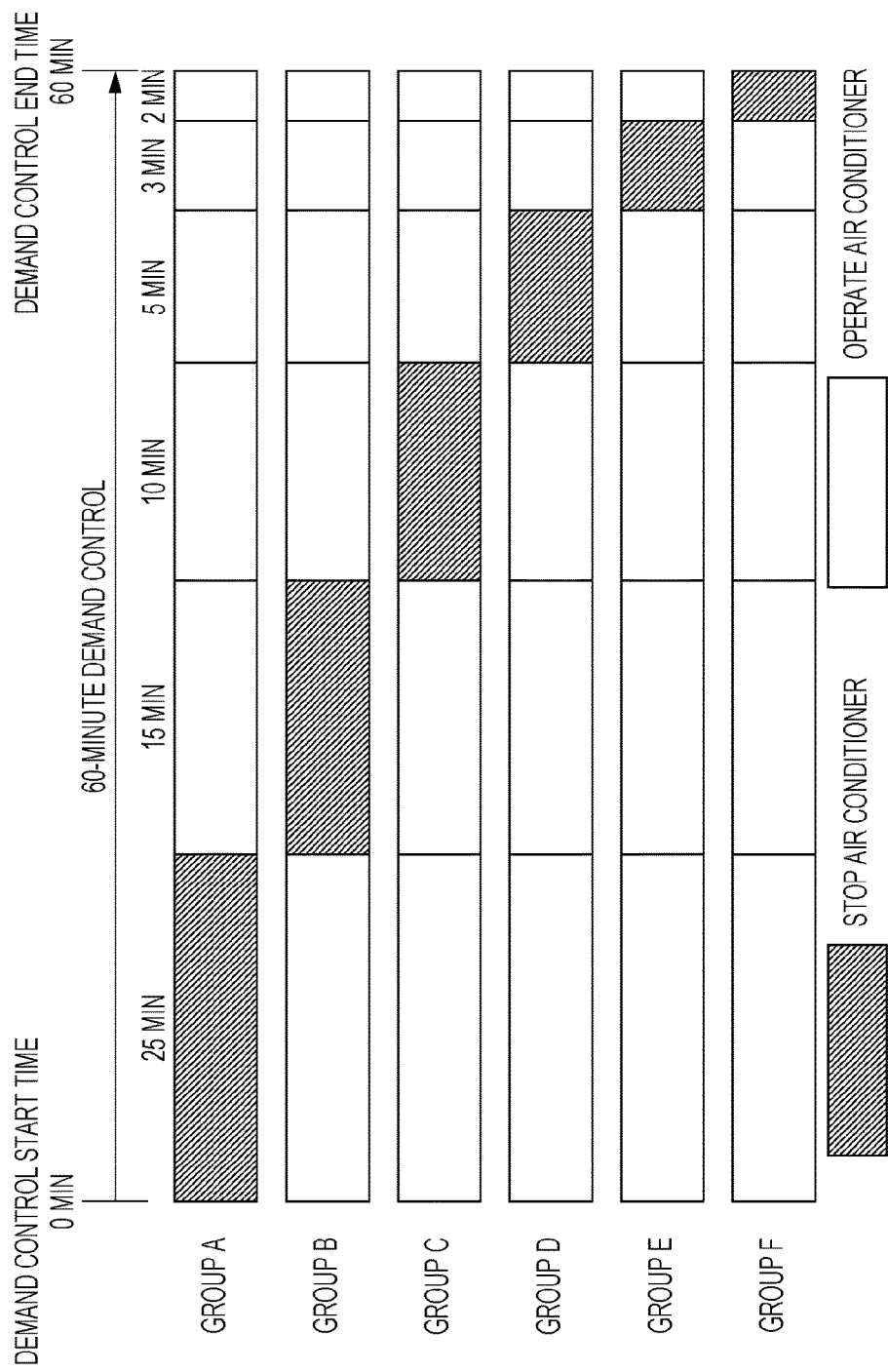
FIG. 8 is a diagram showing an example of drive control on air conditioners disposed in respective areas according to the second embodiment.

FIG. 8 is a diagram showing an example of the drive control on air conditioners of the respective areas according to the present embodiment.

FIG. 8 shows the demand control pattern of the air conditioners 134 of the power consumers 130 belonging to the groups A to F when the demand control time is set to 60 minutes. In the second embodiment, the air conditioners 134 are stopped in demand control time periods which is in rotation and operated in the other time periods. More specifically, each air conditioner 134 is stopped in the demand control time period assigned thereto on the basis of a demand control command signal for stopping the air conditioner 134 sent from the demand control command sending unit 270 and operated in the other time periods on the basis of a demand control command signal for operating the air conditioner 134 sent therefrom. Note that the air conditioner 134 need not necessarily be stopped to perform demand control. Instead of stopping the air conditioner 134, the output thereof may be reduced compared to the normal output. More specifically, in the demand control time period, the output of each air conditioner 134 may be reduced compared to the usual output on the basis of a demand control command signal for reducing the output of the air conditioner 134 compared to the usual output sent from the demand control command sending unit 270; in the other time periods, each air conditioner 134 may be operated as usual on the basis of a demand control command signal for operating the air conditioner 134 as usual sent therefrom.

A specific process performed by the integrated demand control device is similar to that described with reference to the flowchart of FIG. 6 and therefore will not be described.

The integrated demand control method according to the present embodiment has been described with reference to FIGS. 7 and 8. As seen above, in the present embodiment, the order in which the air conditioners 134 of the power consumers 130 are stopped and the time widths with they are stopped are determined considering the comfort of the power consumers 130. To the greatest extent possible, the temperatures of power consumers 130 being demand-controlled are prevented from exceeding the corresponding reference cancellation temperatures. Thus, the demand control is performed at a low cancellation rate.

As a result, if certain power consumers 130 are being excessively cooled or if the residents in certain power consumers 130 are extremely sensitive to the cold, it is possible to perform demand control in such a manner that such differences in environment or resident preference among the power consumers 130 are considered. Thus, it is possible to demand-control the devices of the multiple areas without impairing the comfort or convenience of the residents in the areas.

First Modification of Embodiments

While the devices of the respective power consumers 130 are the air conditioners 134 in the above embodiments, the devices may be refrigeration facilities such as refrigerators or showcases. In this case, the internal temperatures of the devices are measured by the corresponding environmental information sensors 132. By storing, in the cancellation temperature table, the internal temperature at which the demand control has been cancelled, the devices can be demand-controlled as in the above embodiments.

Thus, the demand control can be performed considering the internal temperatures that the refrigeration facilities of the respective areas are required to have. As a result, it is possible to provide an integrated demand control device which can control the refrigeration facilities of the multiple areas without causing inconvenience such as damaging of commodity products stored in the refrigeration facilities due to the demand control.

Second Modification of Embodiments

While the devices of the power consumers 130 are the air conditioners 134 in the above embodiments, the devices may be lighting facilities. In this case, the illuminances of the respective lighting facilities are measured by the corresponding environmental information sensors 132. By storing, in the cancellation illuminance table, the illuminance at which the demand control has been cancelled, the devices can be demand-controlled as in the above embodiments.

Thus, demand control can be performed considering the illuminances that the lighting facilities of the respective areas are required to have. As a result, it is possible to provide an integrated demand control device which can control the lighting facilities of the multiple areas without impairing the comfort of the residents.

Third Modification of Embodiments

In the integrated demand control systems 100 according to the above embodiments, each power consumer 130 may further include a display device including a display. The display device communicates with the communication device 131 to display the demand-controlled groups and details of the demand control determined by the demand-controlled group determination unit 260.

Figure 9:
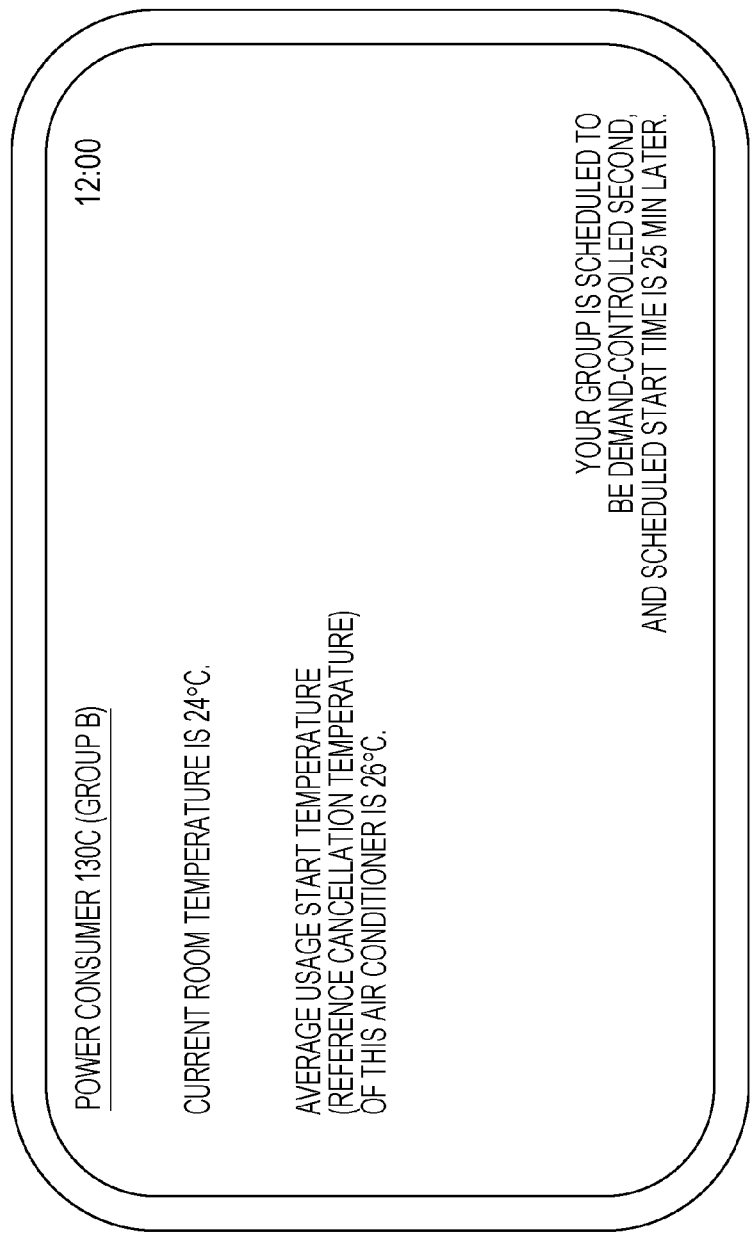
FIG. 9 is a diagram showing a display example of a demand control information display device according to a third modification of the embodiments.

FIG. 9 is a diagram showing a first display example of a demand control information display device according to the present modification.

As shown in FIG. 9, the display device shows demand control information such as the internal temperature of a power consumer 130 being demand-controlled, the reference cancellation temperature thereof, the demand control start time, and the number of the demand-controlled group. An image showing the demand-controlled groups and the time axis, as shown in FIG. 5, may be displayed as information indicating the demand control start time and the demand-controlled groups.

Note that each device control device 133 may include a display.

Thus, the residents of the power consumer 130 can know the demand control schedule, the grouping of the power consumers 130, and the ground for determining the order in which the power consumers 130 are demand-controlled.

In the above embodiments, the elements may be formed by dedicated hardware or may be implemented by executing a software program which is suitable for the elements. The elements may be implemented by causing a program execution unit, such as a CPU or processor, to read and execute a software program recorded in a recording medium, such as a hard disk or semiconductor memory. Examples of software for implementing the integrated demand control devices and the like according to the above embodiments include the following program.

That is, the program is a program for causing a computer to perform an integrated demand control method performed by an integrated demand control device for demand-controlling devices disposed in multiple areas, the integrated demand control method comprising: receiving state indexes indicating states of the areas acquired by sensors; when the device of one area receives a demand control cancellation signal, receiving a cancellation state index of the area; storing the received cancellation state indexes of the areas; determining reference cancellation state indexes of the areas on the basis of the stored cancellation state indexes; determining a demand control condition of the areas on the basis of the determined reference cancellation state indexes; and sending demand control signals to control devices disposed in the areas on the basis of the determined demand control condition.

While the integrated demand control device and the like according to one or more aspects have been described based on the embodiments, the present disclosure is not limited to the embodiments. Various modifications of the embodiments conceived of by those skilled in the art or forms constructed by combining the elements of the different embodiments may be included in the one or more aspects without departing from the spirit and scope of the present disclosure.

The integrated demand control method performed by the integrated demand control device according to the present disclosure and the like can be applied to, for example, aggregators which make contracts with multiple power consumers and demand-control the devices of the power consumers.

What is claimed is:

1. An integrated demand control method for air conditioners disposed in areas, the method comprising:
receiving a temperature of each of the areas;
receiving a demand control cancellation signal of each of the areas;
storing, as a cancellation temperature, the received temperature of each of the areas each time when the demand control cancellation signal is received;
determining a reference cancellation temperature of each of the areas according to a distribution of the stored cancellation temperatures of each of the areas;
setting a higher demand control priority to each of the areas having a smaller demand control allowable index, the demand control allowable index being a difference between the temperature of each of the areas at a predetermined time point and the reference cancellation temperature of each of the areas; and
demand-controlling the air conditioners of the areas based on the demand control priority.

2. The integrated demand control method according to claim 1, wherein the demand-controlling of the air conditioners comprises demand-controlling the air conditioners of the areas in a descending order of the demand control priorities.

3. The integrated demand control method according to claim 1, further comprising assigning longer demand control time periods to the air conditioners of the areas having the higher demand control priorities.

4. The integrated demand control method according to claim 1, further comprising sending stop commands to the air conditioners of the areas in an ascending order of the demand control priorities.

5. The integrated demand control method according to claim 1, wherein the reference cancellation temperature of each of the areas is an expected value of the stored cancellation temperatures of each of the areas.

6. The integrated demand control method according to claim 1, wherein the reference cancellation temperature of each of the areas is the cancellation temperature at which cancellation of demand control has occurred most frequently.

7. The integrated demand control method according to claim 1, wherein displays that display information indicating demand control are disposed in the areas.

8. An integrated demand control method for showcases equipped with refrigeration facilities disposed in areas, the method comprising:
receiving a temperature of each of the showcases;
receiving a demand control cancellation signal of each of the showcases;
storing, as a cancellation temperature, the received temperature of each of the showcases each time when the demand control cancellation signal is received;
determining a reference cancellation temperature of each of the showcases according to a distribution of the stored cancellation temperatures of each of the showcases;
setting a higher demand control priority to each of the showcases having a smaller demand control allowable index, the demand control allowable index being a difference between the temperature of each of the showcases at a predetermined time point and the reference cancellation temperature of each of the showcases; and
demand-controlling the refrigeration facilities based on the demand control priority.

9. An integrated demand control device for air conditioners disposed in areas, the device comprising:
one or more memories; and circuitry operative to:
receive a temperature of each of the areas;
receive a demand control cancellation signal of each of the areas;
store, as a cancellation temperature, the received temperature of each of the areas each time when the demand control cancellation signal is received;

determine a reference cancellation temperature of each of the areas according to a distribution of the stored cancellation temperatures of each of the areas;

set a higher demand control priority to each of the areas having a smaller demand control allowable index, the demand control allowable index being a difference between the temperature of each of the areas at a predetermined time point and the reference cancellation temperature of each of the areas; and demand-control the air conditioners of the areas based on the demand control priority.

\* \* \* \* \*